March 26, 1946.　　G. R. PENNINGTON　　2,397,368
POWER TRANSMITTING MEANS
Filed April 17, 1944　　2 Sheets-Sheet 1
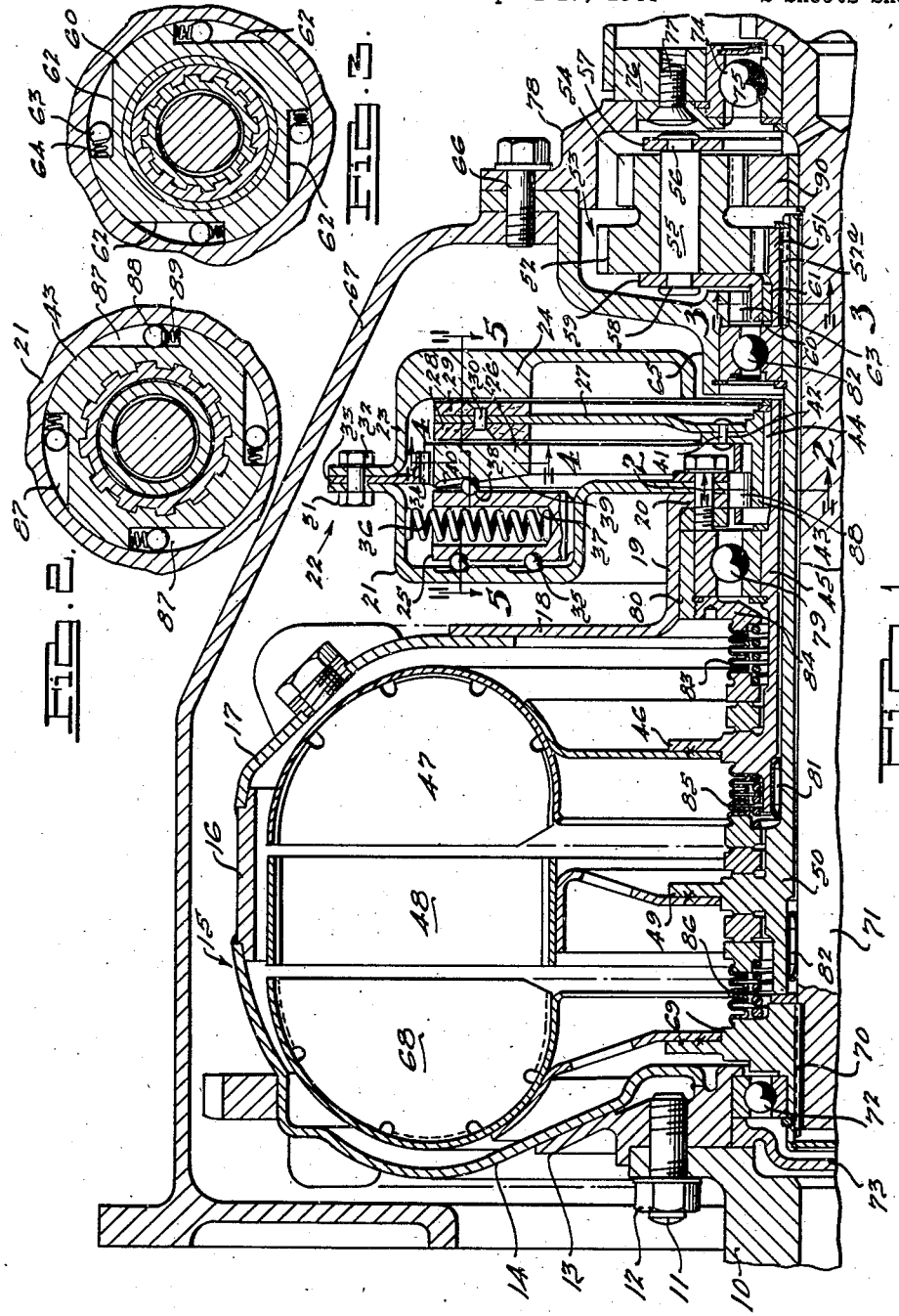
INVENTOR
Gordon R. Pennington
BY Harness and Harris
ATTORNEYS.

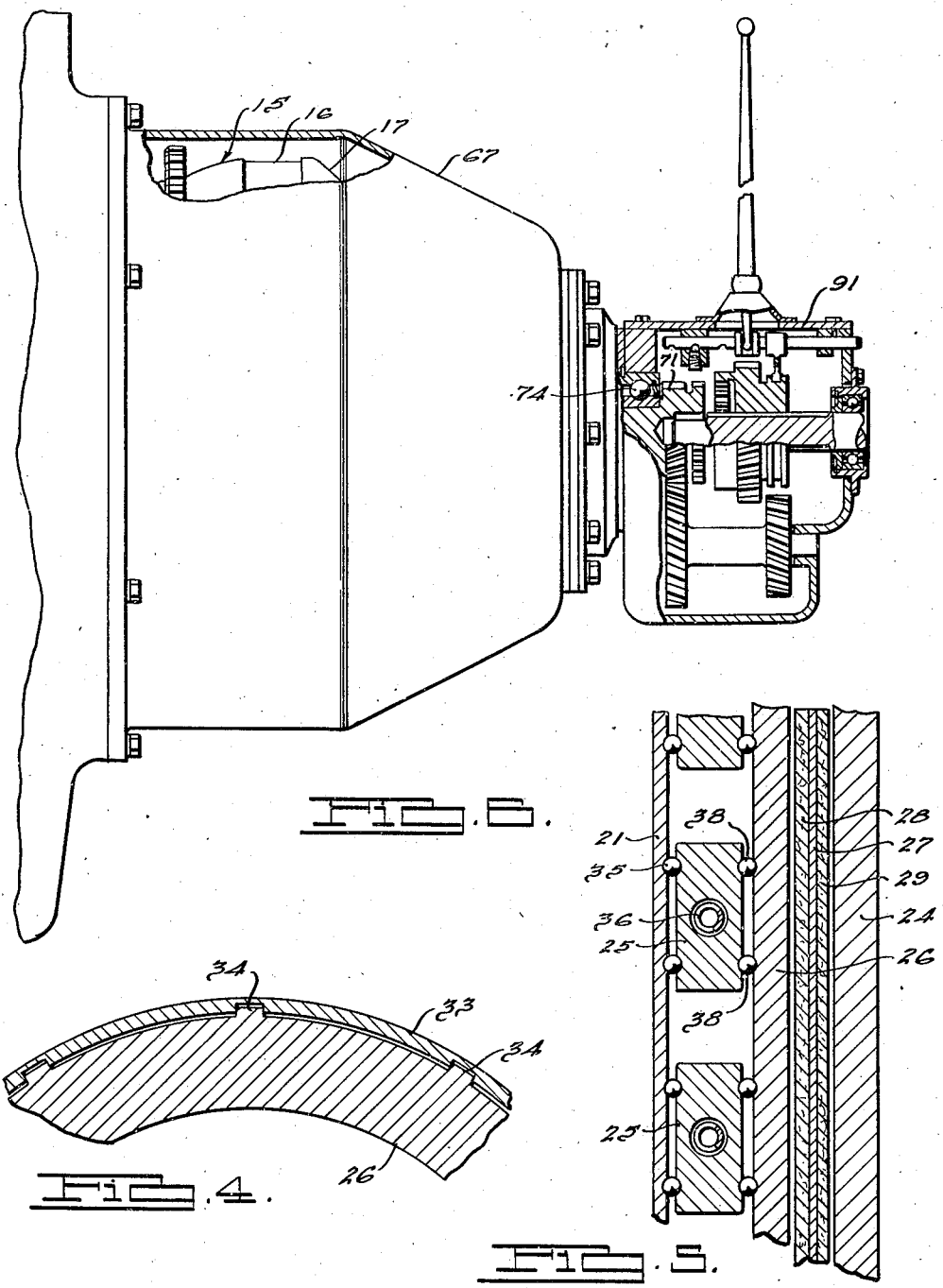

Patented Mar. 26, 1946

2,397,368

UNITED STATES PATENT OFFICE 2,397,368

POWER TRANSMITTING MEANS

Gordon R. Pennington, Bloomfield Hills, Mich., assignor to Chrysler Corporation, Highland Park, Mich., a corporation of Delaware Application April 17, 1944, Serial No. 531,338

9 Claims. (Cl. 192—3.2)

This invention relates to a power-transmitting means. It relates more particularly to a device of the type by which power is transmitted through fluid.

It is desirable to employ a speed-responsive clutch with a fluid coupling so that a vehicle employing the fluid coupling between the engine and certain driven parts will not tend to creep at low or idling speeds of the engine. It is known to employ a speed-responsive coupling with the ordinary simple two-part fluid coupling. According to the present invention, a speed-responsive clutch is combined with a more involved hydraulic coupling or transmission in which two runners are provided, one driving a driven part such as a shaft at a relatively low rate of speed, and the other driving the driven part at a relatively high rate of speed. A speed-responsive clutch may be used to great advantage with the type of hydraulic means just described, for the tendency to creep is very great with the high mechanical advantage derived through the runner driving the shaft at the relatively low rate of speed. Also according to the present invention, there is employed an overrunning clutch in by-passing relation to the speed-responsive clutch so that the engine may be started by movement of the vehicle.

Insofar as the hydraulic means involving the impeller and a plurality of runners are concerned, there is a considerable problem in alignment of the parts. Connected to the impeller and the plurality of runners for driving purposes may be a plurality of closely associated elements such as a shaft and sleeves. The association of these elements with one another and the supporting of them in bearings form part of the present invention.

An object of the present invention is to provide an improvement in a hydraulic power-transmitting means. This means may be a hydraulic transmission involving a plurality of runners operating a driven part in different driving ratios.

Another object is to provide an improved bearing arrangement for a hydraulic power-transmitting means. This means may be associated with a speed-responsive clutch.

A further object is to provide improvements in an assembly involving a hydraulic power-transmitting means and a speed-responsive clutch.

Other objects will appear from the disclosure.

In the drawings:

Fig. 1 is a sectional view through the power-transmitting means of the present invention;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1; and

Fig. 6 is an elevational view partially in section showing the power-transmitting means of the present invention connected to a change-speed transmission.

One end of an engine crankshaft 10 is secured by screws 11 and nuts 12, only one of each being shown, to a fitting 13. The fitting 13 is secured by soldering or welding to a casing part 14 forming part of a casing 15 of which the remaining parts are a ring 16 and a casing part 17. The ring 16 is secured as by soldering or welding to the casing parts 14 and 17 and maintains them in spaced relation. An end member 18 is secured to the casing part 17 and has a cylindrical flange 19 and an inwardly extending radial flange 20, to which is secured a channelled annulus 21 forming part of a speed-responsive clutch 22. The clutch 22 further comprises a channelled annulus 23 having a thickened portion 24, spaced weights 25, a ring 26, and a clutch disc 27 provided with clutch facings 28 and 29 secured thereto by rivets 30. The channelled annuli 21 and 23 are secured to one another by bolts 31 and nuts 32 and secured between them a ring 33 having a splined portion 34 to which the ring 26 is keyed. As shown in Fig. 5 the weights 25 are spaced from one another and are spaced also from the channelled annulus 21 by balls 35 resting in grooves or depressions in the channelled annulus 21 and in the weights 25. Coil springs 36 fit into openings 37 in the weights 25 and engage the channelled annulus 21. They serve to provide resilient resistance to outward movement of the weights 25 due to centrifugal action. Balls 38 space the weights 25 from the ring 26. They rest in grooves in the weights 25. The ring 26 is provided with a side 39 facing the weights 25, which is slightly inclined to the vertical and is provided with grooves 40 also slightly inclined to the vertical and receiving the balls 38. When the weights 25 move outwardly due to centrifugal action caused by rotation, they cause the balls 38 to move outwardly in the inclined grooves 40 in the ring 26. This brings about an axial shifting of the ring 26 to the right resulting in engagement of the ring with the clutch facing 28, which amounts to an engagement of the clutch 22 resulting in transmission of drive from the annuli 21 and 23 to the clutch disc 27.

The clutch disc 27 is secured by rivets 41 to a flange 42 of a member 43 splined as indicated at 44 to one end of a sleeve 45. The other end of the sleeve has a radial flange 46 secured as by soldering or welding to an impeller 47. Adjacent the impeller 47 is a runner 48 secured as by soldering or welding to a radial flange 49 on one end of a sleeve 50 fitting within the sleeve 45. The other end of the sleeve carries a gear ring 51 splined thereon as indicated at 52a. The gear ring 51 is in mesh with a large gear section 52 of a compound pinion 53, of which there may be one or more spaced about the gear ring 51. Only one compound pinion 53 is shown in Fig. 1 and it includes a small gear section 54. Pinion 53 is mounted on a shaft 55 riveted as indicated at 56 to a ring 57 and riveted as indicated at 58 to a ring 59 having a hub portion 60. A short cylindrical ring 61 provides a bearing of the hub portion 60 upon the ring gear 51. As seen in Fig. 3, the hub 60 is provided with recesses 62 in which are mounted balls 63 and springs 64. The recesses, balls, and springs constitute a one-way brake that permits rotation of the hub 60 in a clockwise direction, as viewed in Fig. 3, but prevents counterclockwise rotation of the hub 60 with respect to a member 65 in which the hub is mounted. The member 65 is secured by screws 66 to a stationary housing 67.

Adjacent the runner 48 is a runner 68 secured as by soldering or welding to a hub 69 splined as indicated at 70 on one end of a shaft 71 positioned within the sleeve 50. The end of the shaft 71 on which the hub 69 is mounted, is journalled through the hub by means of a roller bearing 72 in the fitting 13. Between the roller bearing 72 and the engine crankshaft 10 is a closure member 73. The portion of the shaft 71 at the right end of Fig. 1 is carried in a roller bearing 74 mounted in rings 75 and 76 secured to one another by screws 77. The rings 75 and 76 engage a member 78 secured to the housing 67 and the member 65 by the screws 66. An intermediate portion of the sleeve 45 is journalled by a ball bearing 79 in a short sleeve 80 mounted in the flange 19 of the end member 18. The left end of the sleeve 45 is journalled on the sleeve 50 by needle bearings 81 within the sleeve 45. The left end of the sleeve 50 is journalled on the shaft 71 by needle bearings 82 positioned within the sleeve 50 and the right end of the sleeve 50 is journalled on roller bearing 82 carried in the member 65. A seal 83 is positioned between the flange 46 and the bearing 79 and includes a ring 84 having threaded engagement with the sleeve 80. A seal 85 is positioned between the flange 46 and the flange 49, and a seal 86 is positioned between the flange 49 and hub 69.

As shown in Fig. 2, there is provided in the sleeve 43 a plurality of recesses 87 in each of which is mounted a ball 88 and a spring 89. These recesses, balls, and springs constitute a one-way clutch between the ring 43 and the channelled annulus 21 and the flange 20 of the end member 18. The clutch is so arranged that it permits clockwise rotation, as shown in Fig. 2, of the annulus 21 with respect to the ring 43 and prevents clockwise rotation of the ring 43 with respect to the annulus 21.

In operation, the engine crankshaft 10 causes the casing 15 to rotate. This rotation is transmitted to the annuli 21 and 23 and the weights 25. When the speed becomes sufficiently great the weights 25 move outwardly against the action of the springs 36 to cause the ring 26 to be shifted into engagement with the clutch facing 28 and the clutch facing 29 to become engaged with the thickened portion of the annulus 23. Thus the clutch disc 27 is caused to rotate and the sleeve 45 and the impeller 47 rotate. Fluid contained in the casing 15 is carried about with the impeller 47 and the runner 48 is caused to rotate. The resultant rotation of the sleeve 50 to which the runner 48 is attached causes the ring gear 51 to rotate. The compound pinion 52 meshing therewith rotates and transmits that rotation to a gear 90 secured to the shaft 71 which projects into a transmission casing 91, as indicated in Fig. 6. As the speed of rotation increases, the fluid in the casing 15 impelled by the impeller 47 reaches the runner 68 and causes it to rotate. The runner 68 acts through the hub 69 to rotate the shaft 71. When the shaft 71 is rotated by the runner 68 it drives the compound pinion 53, and the ring 59 carrying the pinion 53 rotates because of the fact that the large gear section 52 tends to move the sleeve 50 at a greater speed than the speed at which the shaft 71 moves. The one-way brake formed of the recesses 62, the ball 63, and the spring 64 permit the necessary clockwise rotation of the ring 59 and its hub 60. It will be understood that the shaft 71 when driven by the runner 48 through the sleeve 50, the gears 51 and 90, and the compound pinion 52, rotates at a lower speed than when driven directly by the runner 68, since the large and small gear sections 52 and 54 of the compound pinion 53 effect a speed reduction.

When the car in which the previously described structure is mounted, is at a standstill and the engine crankshaft 10 is rotating at idling speed, there is no tendency for the car to creep through the action of the fluid coupling. This is due to the fact that the speed responsive clutch 22 is so arranged as not to become engaged at an idling speed of the engine crankshaft 10. Instead the clutch 22 engages at some definitely higher speed. Thus at idling speed the impeller 47 is not rotated and as a consequence, there is no tendency for the runners 48 and 68 to rotate. It will be understood that the speed responsive clutch 22 is of great advantage with a fluid coupling of the type shown involving the runners 48 and 68, the runner 48 driving the shaft 71 at a reduced speed. With the reduction in speed between the runner 48 and the shaft 71 the tendency to creep would be very great if the speed responsive clutch 22 were not present, since not much force is required to rotate the runner 48.

As has been previously stated, the sleeve 45 is journalled on the flange 19 of the end member 18 by the roller bearing 79. Since the roller bearing 79 is mounted in the flange 19, the roller bearing is adjacent the channelled annuli 21 and 23 of the speed responsive clutch 22. The clutch disc 27 is connected to the sleeve 45 by the member 43 at a region very near the roller bearing 79. Thus there is present an arrangement in which the driven part of the clutch 22, namely, the disc 27 is supported by the bearing 79 on the part 19 closely adjacent the driving parts of the clutch 22, namely, the channelled annuli 21 and 23. This arrangement prevents misalignment of the clutch disc 27 and the annuli 21 and 23.

As has been previously described, the one-way clutch formed of the recesses 87, the balls 88, and the springs 89 permits the flange 20 of the end member 18 and the annulus 21 to be rotated clockwise with respect to the sleeve 43, but prevents clockwise rotation of the sleeve 43 with respect to the flange 20 and the annulus 21. The result is that when the casing 15 is driving and tending to move at a greater speed than the sleeve 43, the one-way clutch is disengaged. However, when the sleeve 43 is made the driving member and tends to rotate faster than the casing 15, the one-way clutch referred to becomes engaged and the sleeve 43 drives the casing 15 through the end member 19. Thus the car may be started by pushing or pulling, rotation of the car wheels causing rotation of the shaft 71. This rotates the runner 68 which acts as an impeller to rotate the regular impeller 47, the latter acting through the sleeve 45 to rotate the sleeve 43.

The intention is to limit the invention only within the scope of the appended claims.

I claim:

1. In combination, a driving means, a driven means, a fluid impeller, a speed-responsive clutch connecting the driving means and the fluid impeller, a first runner positioned adjacent the fluid impeller for being driven thereby, a second runner positioned adjacent the fluid impeller for being driven thereby, means connecting the first runner and the driven means for causing the driven means to be driven at a relatively low speed for a certain speed of the first runner, means connecting the second runner and the driven means for causing the driven means to be driven at a relatively high speed for a certain speed of the second runner, and an overrunning clutch for drivingly connecting the fluid impeller and the driving means upon operation of the fluid impeller at a greater speed than the driving means.

2. In combination, a driving means, a driven means, a casing, means connecting the driving means and the casing for driving the casing, a fluid impeller, a speed-responsive clutch connecting the casing and the fluid impeller, a first runner positioned adjacent the fluid impeller for being driven thereby, a second runner positioned adjacent the fluid impeller for being driven thereby, means connecting the first runner and the driven means for causing the driven means to be driven at a relatively low speed for a certain speed of the first runner, means connecting the second runner and the driven means for causing the driven means to be driven at a relatively high speed for a certain speed of the second runner, and an overrunning clutch for drivingly connecting the fluid impeller and the casing upon operation of the fluid impeller at a greater speed than the casing.

3. In a motor vehicle having an engine, a driven shaft, a fluid coupling connected to the driven shaft, and a speed-responsive clutch for causing drive to be transmitted from the engine to the fluid coupling above a predetermined speed of the engine to prevent creep of the car below the predetermined speed of the engine, the combination with the speed-responsive clutch, of an overrunning clutch operative in response to operation of the driven shaft at a greater speed than that produced by engine operation drivingly to connect the fluid coupling and the engine in by-passing relation to the speed-responsive clutch for permitting the engine to be started by movement of the vehicle.

4. In a motor vehicle having an engine, a driven shaft, a hydraulic transmission comprising an impeller, two runners, means for connecting one runner and the driven shaft at a relatively low rate of speed in comparison to the speed of the said one runner, and means for connecting the other runner and the driven shaft at a relatively high rate of speed in comparison with the speed of the said other runner, the combination with the hydraulic transmission, of a speed-responsive clutch for drivingly connecting the engine and the impeller above a predetermined speed of the engine to prevent creep of the vehicle below the predetermined speed, and an overrunning clutch operative in response to operation of the driven shaft at a greater speed than that produced by engine operation drivingly to connect the fluid coupling and the engine in by-passing relation to speed-responsive clutch for permitting the engine to be started by movement of the vehicle.

5. In combination, a hydraulic coupling comprising a casing, an impeller within the casing, and a runner within the casing, a driven part connected to the runner, a speed-responsive clutch for drivingly connecting the casing and the impeller above a predetermined speed of the casing and comprising a first member connected to the casing and a second member, a sleeve connected at one end to the second member and at the other end to the impeller, means journaling the sleeve on the driven part, means journaling the sleeve on the casing adjacent the speed-responsive clutch, and an overrunning clutch for drivingly connecting the casing and the sleeve upon operation of the sleeve at a greater rate than the casing.

6. In combination, a hydraulic transmission comprising a casing, an impeller, a first runner, a second runner, all within the casing, a shaft drivingly connected with one runner, an inner sleeve connected with the other runner and surrounding the shaft, an outer sleeve connected to the impeller and surrounding the inner sleeve, a speed-responsive clutch for drivingly connecting the casing and the outer sleeve above a predetermined speed of the casing, means journaling the outer sleeve on the casing adjacent the speed-responsive clutch, and an overrunning clutch for drivingly connecting the casing and the outer sleeve upon operation of the sleeve at a greater rate than the casing.

7. In combination, a hydraulic transmission comprising a casing, an impeller within the casing, a first runner adjacent the impeller within the casing, a second runner spaced from the impeller within the casing, a shaft drivingly connected at one end to the second runner, means journalling the second runner within the casing, means journalling the said one end of the shaft on the casing, a support, means journalling the other end of the shaft on the support, an inner sleeve surrounding the shaft and connected to the first runner, means journalling the inner sleeve adjacent the first runner, means journalling the inner sleeve on the support, means positioned adjacent the support for driving the shaft from the inner sleeve at a speed less than that of the sleeve, an outer sleeve surrounding the inner sleeve and connected to the impeller, means journalling the outer sleeve on the inner sleeve at a region adjacent the impeller, a speed-responsive clutch for drivingly connecting the casing and the outer sleeve above a predetermined speed of the casing, means for journalling the outer sleeve in the casing adjacent the speed-responsive clutch, and an overrunning clutch for drivingly connecting the casing and the outer sleeve upon operation of the sleeve at a greater rate than the casing.

8. In combination, a hydraulic transmission comprising a casing, an impeller within the casing, a first runner adjacent the impeller within the casing, a second runner spaced from the impeller within the casing, a shaft drivingly connected at one end to the second runner, means journaling the second runner within the casing and providing through the second runner support for the said one end of the shaft, a support, means journaling the other end of the shaft on the support, an inner sleeve surrounding the shaft and connected to the first runner, means journaling the inner sleeve on the shaft at a region adjacent the first runner, means journaling the inner sleeve on the support, means positioned adjacent the support for driving the shaft from the inner sleeve at a speed less than that of the sleeve, an outer sleeve surrounding the inner sleeve and connected to the impeller, means journaling the outer sleeve on the inner sleeve at a region adjacent the impeller, a speed-responsive clutch for drivingly connecting the casing and the outer sleeve above a predetermined speed of the casing, means for journaling the outer sleeve in the casing adjacent the speed-responsive clutch, and an overrunning clutch for drivingly connecting the casing and the outer sleeve upon operation of the sleeve at a greater rate than the casing.

9. In combination, a driving means, a driven means, a fluid impeller, a speed-responsive clutch connecting the driving means and the fluid impeller, a runner positioned adjacent the fluid impeller for being driven thereby, means drivingly connecting the runner and the driven means, and an overrunning clutch for drivingly connecting the fluid impeller and the driving means upon operation of the fluid impeller at a greater speed than the driving means.

GORDON R. PENNINGTON.